April 5, 1960  H. H. McADAM ET AL  2,931,927
DIRECT CURRENT HERMETIC MOTOR COMPRESSOR
Filed Nov. 14, 1956  3 Sheets-Sheet 1

INVENTORS
HARRY H. McADAM
BY J. HAROLD KARR

A. Abraham Owen
ATTORNEY

INVENTORS
HARRY H. McADAM
BY J HAROLD KARR
ATTORNEY

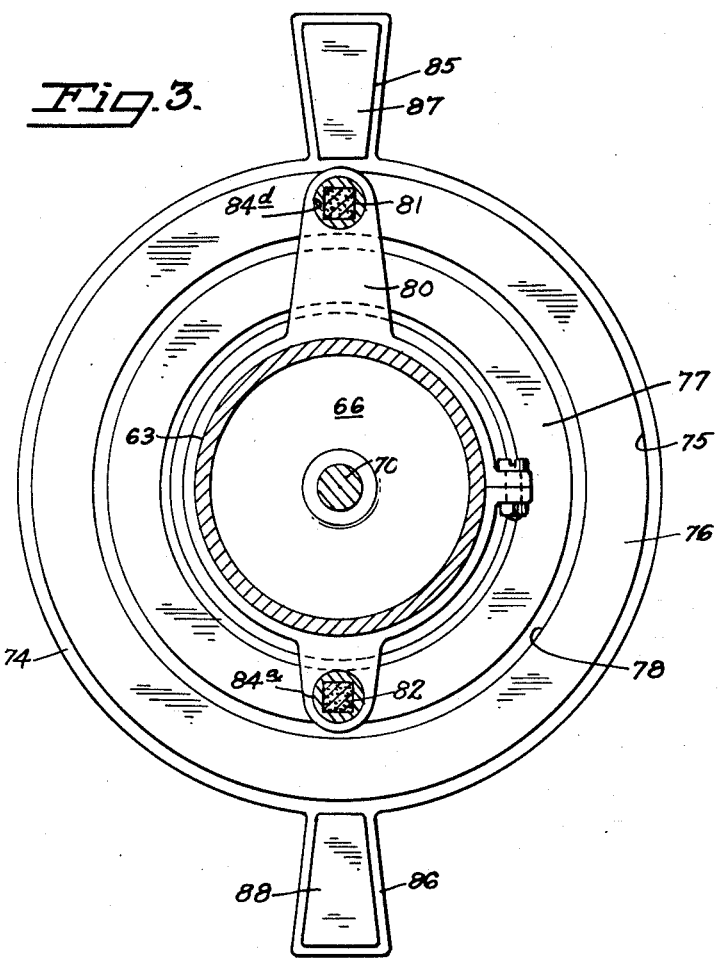
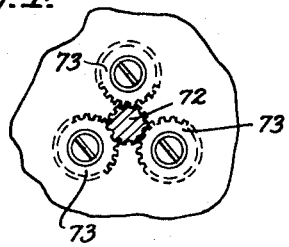
INVENTORS
HARRY H. McADAM
BY J HAROLD KARR
ATTORNEY

United States Patent Office 2,931,927
Patented Apr. 5, 1960

2,931,927

DIRECT CURRENT HERMETIC MOTOR COMPRESSOR

Harry H. McAdam, Redwood City, Calif., and J Harold Karr, Springfield, Ohio

Application November 14, 1956, Serial No. 622,089

10 Claims. (Cl. 310—67)

This invention relates to direct-current electric motors and particularly to a hermetically sealed direct-current motor compressor.

Heretofore, direct-current motors have proved unsuccessful when used to power a sealed refrigeration system requiring a permanent charge of refrigerant and oil. The failures have been largely due to the wear, arcing, and erosion of the brushes and commutator, which were incorporated within the sealed system. Furthermore, the location of the commutator and brushes inside the sealed motor compressor, where they operated in a refrigerant vapor and oil spray atmosphere, aggravated the normally serious erosion problem. Obviously, eroded brushes and commutators should be periodically replaced, but replacement is just as obviously impossible without invading the sealed system.

An important object of the present invention is to provide a novel type of direct-current electric motor that can be used satisfactorily in an hermetically sealed system. The invention solves the problems which the prior art had not been able to solve.

Another object of the invention is to provide an hermetically sealed direct-current motor compressor.

Another object is to provide a sealed direct-current motor in which the brushes and commutator are outside the sealed system, where they can easily be replaced and where replacement involves no invasion of the sealed system.

Another object of the invention is to provide a direct-current motor utilizing a small auxiliary electric motor of about one-tenth or less the power required to drive the main compressor motor. This secondary motor, which incorporates a secondary rheostat for controlling the rotative speed of the main direct-current motor, is utilized to drive rotating brushes around a stationary commutator, without providing or consuming any additional power.

Another object of the invention is to create a rotating magnetic field within the main motor stator's wire coils by mechanical rotation of brushes around a stationary commutator. The mechanical rotation is independent of the electrical characteristics of the system, and may be obtained by electric, hydraulic, engine, or manual means. As a result, the speed of rotation may be controlled to suit the application.

Other objects and advantages of the invention will appear from the following description of a preferred form thereof given in accordance with 35 USC 112.

In the drawings:

Fig. 3 is a view in section taken along the line 3—3 in Fig. 1.

Fig. 4 is a view in section taken along the line 4—4 in Fig. 1.

This invention utilizes two direct-current motors: a main D.C. motor M sealed within the compressor package and an auxiliary D.C. motor A outside the compressor package. The auxiliary motor A is utilized solely to rotate the brushes and allied parts and does not provide any power to the compressor. The structure and operation of these two motors and their relation to each other will be better understood from the following description of the unit.

*The compressor package P*

Figure 1:
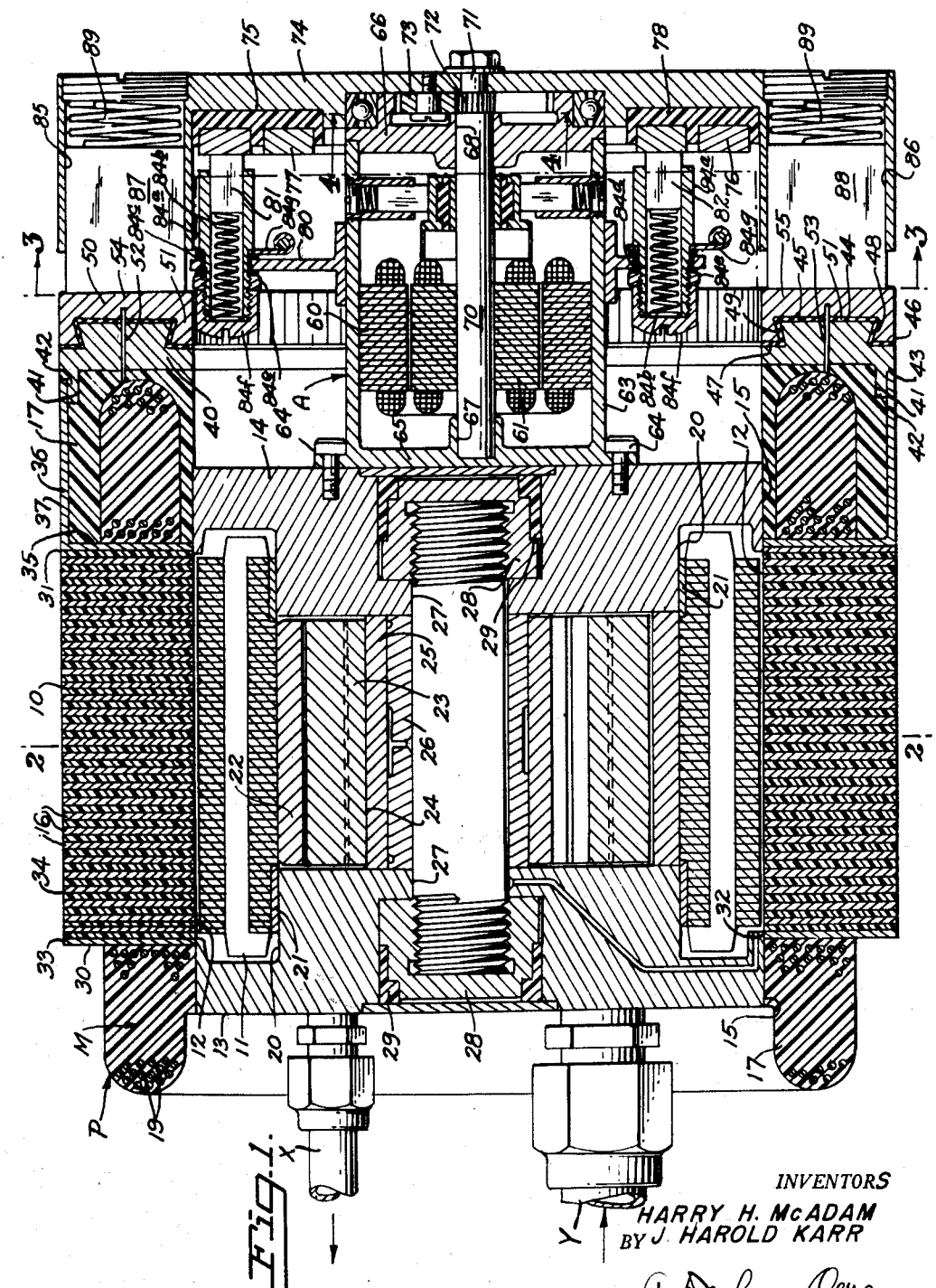
Fig. 1 is a view in elevation and in section of a direct-current hermetically sealed motor compressor unit embodying the principles of the present invention.

The main motor M includes a compressor package P, preferably made in accordance with the invention disclosed in Patent No. 2,761,078 issued to Harry H. McAdam on August 28, 1956, wherein the pumping elements are enclosed within the motor rotor and wherein the stator, closed by suitable end plates, is utilized as a pressure vessel within which the rotor and the pumping elements operate. Thus, Fig. 1 shows a wire-wound stator 10 with a squirrel-cage rotor 11 inside it. The ends of the stator bore 12 are closed by stationary end-plates 13 and 14, whose outer peripheries 15 snugly engage the stator bore 12 and may be sealed to it either by suitable O-rings or, preferably, by a suitable thermosetting plastic.

The stator 10 itself has its lamination 16 interfaces secured and sealed together fluid-tight, preferably by a thermo-setting plastic 17 as set forth in the co-pending patent application Serial No. 560,853, now Patent No. 2,858,291 filed January 23, 1956, by Harry H. McAdam. Also, the stator has its slots 18 sealed by the plastic 17, preferably applied in accordance with the Harry H. McAdam patent application Serial No. 560,841, now Patent No. 2,846,599 filed January 23, 1956, and the plastic 17 projects beyond the wire windings 19 of the stator 10. While I prefer to use the stator 10 itself as the pressure vessel, this is not necessary, and instead the pressure vessel may comprise a sleeve inserted in the stator 10, somewhat as shown in Harry H. McAdam Patent No. 2,711,286 issued June 21, 1955.

Figure 2:
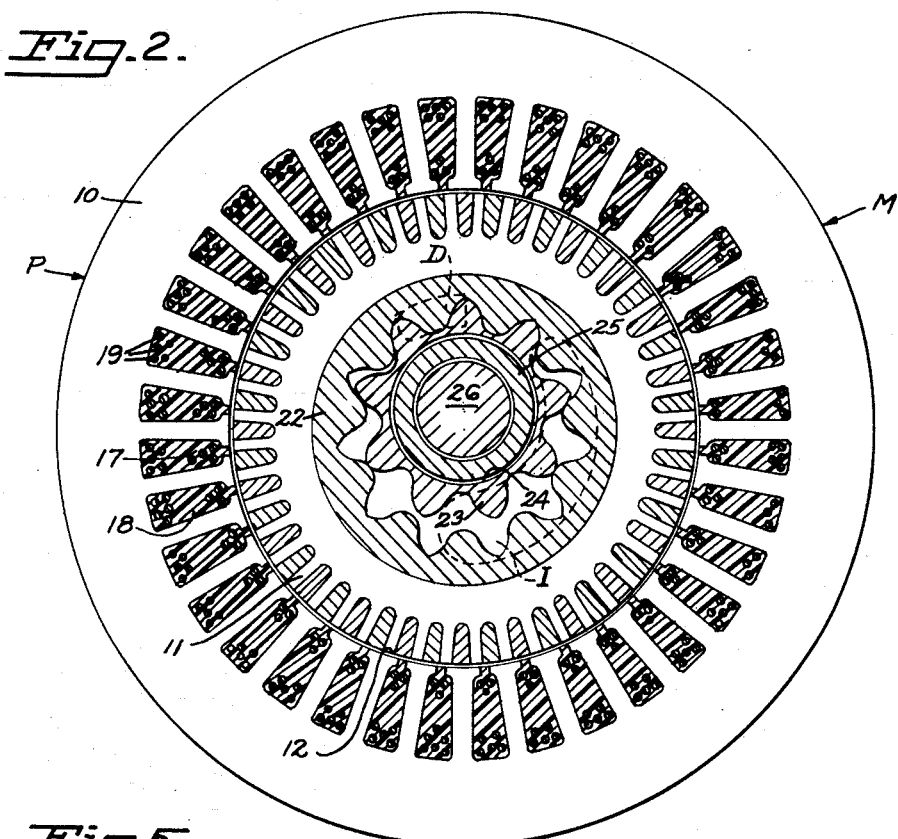
Fig. 2 is a view in section taken along the line 2—2 in Fig. 1.

The end plates 13 and 14 are in general constructed as described in Patent No. 2,761,078, each preferably being stepped so as to provide a cylindrical bearing 20 concentric with and spaced radially in from the stator bore 12, the rotor rotating on its bearings 21. Rigidly secured within the rotor 11 is an outer pump element 22, preferably of the toothed "rotoid" type described in Patent No. 2,761,078. The teeth of the outer pump element 22 engage and drive an inner pump element 23 of the same type mounted eccentrically thereto. The inner pump element 23 has a concentric opening 24 therethrough by which it is mounted around a bearing sleeve 25, which in turn is mounted concentrically around a stationary bolt-bearing member 26. In other words, the inner pump element 23 and the bolt-bearing member 26 are concentric and both are eccentric with respect to the stator bore 12, the rotor 11, and the outer pump element 22. The ends of the bolt-bearing member 26 extend through off-center openings 27 in the end plates 13 and 14 and are secured by nuts 28, which are hermetically sealed to the end plates 13 and 14, as by thermosetting plastic 29. The bolt 26 and nuts 28 are tightened sufficiently to give just adequate clearance for operation of the motor compressor unit. Suitable intake and discharge openings are provided. In the form illustrated, both the intake port I and the discharge port D pass through the same end plate 13 and are connected to suitable conduits X and Y respectively (see Figs. 1 and 2).

As so far described, the structure is substantially the same as that of the motor compressor described in Patent No. 2,761,078, which is designed to be operated by alternating current. Both units operate by the rotor 11 rotating and driving the two compressor pump elements 23 and 24 to suck in fluid through the port I and expel it through the discharge port D. From here on, however, the construction is entirely different.

*The main motor M and its commutator 50 outside the package P*

The stator 10 is preferably strengthened at each end by a pair of rings 30 and 31 thicker than the laminations 16. The ring 30 which lies just beyond the last lamination 16 on the left hand side of Fig. 1 is preferably a flat ring of stainless steel or other non-magnetic material whose central opening 32 is exactly the same size as the stator bore 12 and whose outer periphery 33 is the same as the outer periphery 34 of the stator 10. The other ring 31, at the right hand end of the stator in Fig. 1 is different in shape, having both a radial flange 35 generally like the ring 30, and an axial cylindrical flange 36 extending outwardly from the stator 10 and whose outer periphery 37 is the same as the outer periphery 34 of the stator 10. The axial flange 36 encompasses the portion of the solid plastic sealing material 17 which encases the portions of the wires 19 that extend beyond the end of the stator laminations 16. At the outer end thereof is a ring 40, preferably of die cast aluminum. For this purpose the plastic 17 is provided with an annular recess 41 into which an annular flange 42 of the ring 40 projects, in contact with the axial flange 36 of the support ring 31. An annular shoulder 43 rests against the end of the flange 36.

Figure 5:
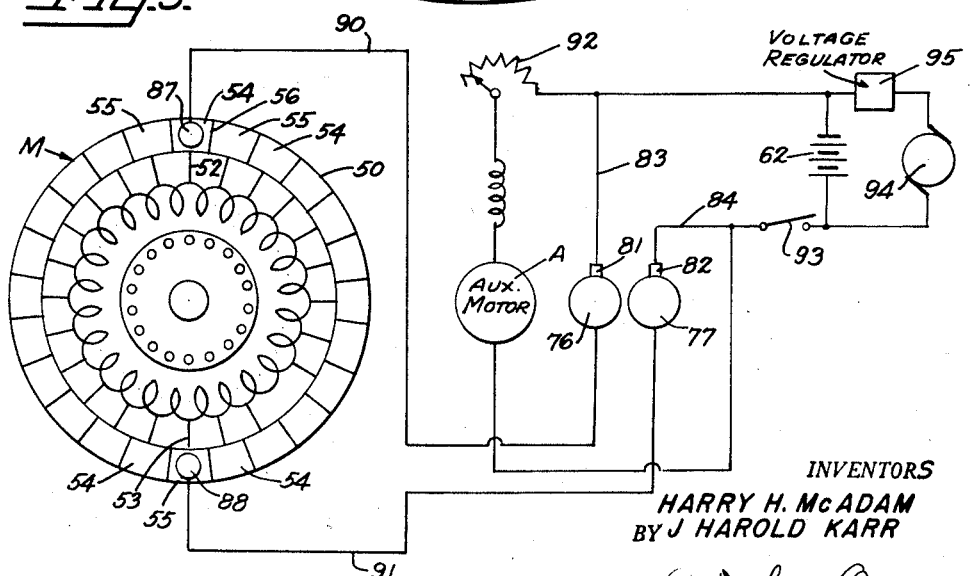
Fig. 5 is an electrical circuit diagram for the motor of this invention.

The outer end face 44 of the ring 40 is shaped to provide a central face 45 between and projecting out beyond inner and outer shoulders 46 and 47, the projecting rims 48 and 49 preferably sloping in as shown. On these end surfaces 45, 46, 47, 48, and 49 is supported a stationary segmented commutator 50, preferably of copper segments, a layer of mica insulation 51 being provided between the ring 40 and the commutator 50. A lead wire 52 or 53 extends from each commutator element 54 or 55, extends through the mica insulation 51, the aluminum ring 40 and the plastic 17, and is connected to the stator wire windings 19. In the commutator ring itself, as shown in Fig. 5, each segment 54 or 55 is insulated from each other segment 55 or 54 by an insulator segment 56, made from material such as mica.

It will be seen from the description so far that rotating brushes in contact with the commutator 50 will energize and rotate the rotor 11 inside the stator 10. It will also be seen that the rotor 11 and pumping elements 22 and 23 are hermetically sealed inside the pressure vessel provided by the stator 10 and the end plates 13 and 14, with the commutator 50 outside the pressure vessel. Thus there is no problem in replacing the commutator segments or the brushes, and so the chief difficulty has been solved by a structure in which the commutator can be placed outside the hermetic compressor package P. It now remains to describe how the brushes are rotated around the commutator 50.

*The auxiliary motor A*

As previously mentioned, there is an auxiliary D.C. motor A. This motor A has its own stator 60 and rotor 61 and is supplied with current from a battery 62. The motor A is preferably housed in a housing 63, which may for convenience be secured to the end plate 14 concentric to the commutator 50, by bolts 64, although other arrangements are obviously possible. The housing 63 has its own supporting end plates 65 and 66 with concentric and coaxial openings 67 and 68 therethrough that accommodate a shaft 70 secured to and rotating with the rotor 61.

The outer end 71 of the shaft 70 is provided with a pinion 72 that drives a set of planetary reduction gears 73 (Fig. 4). These planetary reduction gears 73 in turn drive a rotating brush and slip ring holder 74. The holder 74 is provided with an annular recess 75 in one end face that holds two concentric annular slip rings 76 and 77 and a member 78 that insulates them from each other and from the holder 74. Thus the energization of the motor A causes the rotor 61 to rotate the shaft 70 and thereby to rotate the slip rings 76 and 77 by virtue of rotating their holder 74.

A stationary auxiliary slip-ring brush holder 80 is provided with two brushes 81 and 82, one of which retains contact with the outer slip ring 76 and the other of which maintains contact with the inner slip ring 77. The brush 81 is connected by lead 83 to one end of the battery 62, and the brush 82 is connected by lead 84 to the other end of the battery 62.

Each brush 81, 82 may be carbon and may be held in the holder 80 by a brass tube 84a and be urged against its slip ring 76, 77 by a spring 84b. The tube 84a itself may extend through an insulating washer 84c that is secured by its flanges into an opening 84d through the holder 80. A lock nut 84e and cap nut 84f thread on the brass tube 84a, and a wire lug 84g provides the contact to the lead wire.

The main brush and slip-ring holder 74 is also provided with a pair of receptacles 85, 86 at outer diametric ends that support the main brushes 87 and 88 in contact with the segmented commutator ring 50. As each brush 87 moves across a commutator segment 54, it is in contact with and sends current through it to the main motor M and back to commutator segment 55 and its brush 88. The brush receptacles 85 and 86 also support a spring loading member 89 for each brush 87 and 88. A suitable wire 90 leads from the slip ring 76 to the brush 87, and a wire 91 connects the slip ring 77 to the brush 88.

*Operation*

The basic operation of the motors M and A may be seen from the circuit diagram in Fig. 5. As will be seen, the battery 62 supplies current to the auxiliary motor A through a motor speed control rheostat 92, a switch 93 being provided for turning the auxiliary motor A on and off. The rheostat 92 reduces the current to the value needed, so that only about one-tenth of the battery output goes to the motor A. In parallel with the battery there may be and preferably are a generator 94 and a voltage regulator 95. The small motor A drives the slip rings 76 and 77, which are in contact with the slip ring brushes 81 and 82. Current thus passes from one side of the battery 62 via lead 83 to the slip ring brush 81, and from there to the slip ring 76. The wire 90 leads it to the brush 87 and commutator segment 54, into the wire windings 19 for the stator 10, thereby energizing the rotor 11. Thence, current passes from the commutator segment 55 to the brush 88, wire 91, slip ring 77, slip ring brush 82, and lead 84 back to the other side of the battery 62. The rotor 11 turns, and it drives the pump elements 22 and 23 to draw in fluid through the intake port I and send it out, compressed if desired and if the fluid is compressible, through a discharge port D.

It will be noted that current passes from the battery 62 and generator 94 to the slip ring brushes 81 and 82 without going through the auxiliary motor A. The control rheostat 92 is thereby able to provide such a load that only a small proportion of the current will actually go to the small motor A, the purpose of which, as said before, is merely to rotate the brushes 87 and 88, the speed of rotation being controlled by the rheostat 92. The main current is supplied through the lines 83 and 84 and is passed on to the main motor M through the brushes 87 and 88 and the commutator 50. Therefore, only a small proportion of the power is used in moving the brushes 87 and 88, and the remainder of the power is available for very efficient hermetic operation.

Thus it becomes possible to use a battery 62 and generator 94 of the direct-current type to drive a hermetically sealed motor M and still to have the commutator and brush elements 54, 55, 87 and 88 exposed where they can be readily replaced. As it is also possible to provide refrigerating elements with sealed motors for use wherever alternating current is not available but where direct current is practical.

When the brushes 87 and 88 are energized from the battery 62 and are rotated, currents are caused to flow in the stator windings 19, creating a rotating magnetic field in the air gap of the main motor M. The rotating magnetic field which results from the mechanical rotation of the energized brushes around a stationary commutator drives the rotor 11 in synchronism with the rotating field and in synchronism with the rotating brushes. There are no brushes or slip rings in contact with the fluid being pumped; therefore a sealed refrigerant system can be provided for indefinite operation.

Since the motor A is used only for rotating the brushes 87 and 88, it is obvious that it may, if desired, be replaced in some uses by other brush-rotating means, such as hydraulic, manual, gravity, engine, or gas-blast power means. Use of the auxiliary electric motor A is, of course, generally to be preferred. It makes possible the use of the assembly as a variable-speed prime mover, with the rheostat 92 controlling the motor A, which uses less than one-tenth of the current of the main motor M. Moreover, by providing the switch 93 where it controls both the auxiliary motor A and the main motor M (the proper design of rheostat 92 being used), there will never be any passage of current through the motor M except when motor A is rotating.

To those skilled in the art to which this invention relates, many changes in construction and widely differing embodiments and applications of the invention will suggest themselves without departing from the spirit and scope of the invention. For example, there is no intention of limiting the number of commutator brushes 87, 88 or the number of slip-ring brushes 81, 82 to two. There may be four of either or both, or there may be any number from two up. Usually these will act as a pair of brush means in each instance, since there cannot be less than two slip rings 76, 77. Just how many brushes may be determined in conformity with standard engineering practice depending on performance characteristics desired in any particular design of electric motor. The disclosures and the description herein are purely illustrative and are not intended to be in any sense limiting.

We claim:

1. A direct current hermetic motor-pump, including in combination a motor comprising a pressure vessel incorporating a wire-wound stator and a rotor; compressor pump elements inside said pressure vessel driven by said rotor; a commutator ring of segments supported by said stator outside said pressure vessel and connected electrically to said stator windings; a rotatable member outside said pressure vessel having brushes supported in contact with said commutator; and externally situated and externally operated power means for rotating said rotatable member, whereby said commutator ring, said brushes, and said power means are accessible for repair and replacement of parts without disturbing the hermetic system enclosed by said pressure vessel.

2. A direct current hermetic motor-pump, including in combination a main motor comprising a pressure vessel incorporating a wire-wound stator and a squirrel-cage rotor; compressor pump elements inside said pressure vessel driven by said rotor; a stationary commutator ring of segments supported by said stator outside said pressure vessel and connected electrically to said stator windings; a rotatable member outside said pressure vessel having brushes supported in contact with said commutator; an auxiliary motor outside said pressure vessel for rotating said rotatable member; and means outside said pressure vessel for connecting a power source of direct current across said brushes and, through a resistance, to said auxiliary motor, the speed of the auxiliary motor being mechanically imposed on said main motor by the rate of rotating the rotating brushes.

3. A direct current hermetic motor-pump, including in combination a main motor having a wire-wound stator and end plates providing a pressure vessel, a squirrel-cage rotor inside said pressure vessel, and compressor pump elements inside said pressure vessel driven by said rotor; a commutator ring supported by said stator outside said pressure vessel and having a plurality of segments each connected through said stator windings to another segment; a rotatable member outside said pressure vessel having a plurality of brush means supported in contact with said commutator and during rotation successively engaging said segments that are connected together through said stator windings, said member also supporting a plurality of slip rings insulated from each other, each one being connected to one said brush means; a plurality of slip-ring brush means; means outside said pressure vessel for supporting a said slip-ring brush means outside said pressure vessel in engagement with each said slip ring; an auxiliary motor outside said pressure vessel for rotating said rotatable member; and means outside said pressure vessel for connecting a power source of direct current to each said slip-ring brush means.

4. A direct current hermetic motor-pump, including in combination a main motor having a wire-wound stator and end plates providing a pressure vessel, a rotor inside said pressure vessel, and compressor pump elements inside pressure vessel driven by said rotor; a commutator ring supported by said stator outside said pressure vessel and having a plurality of segments each connected through said stator windings to another segment; a rotatable member outside said pressure vessel having brushes supported in contact with said commutator and during rotation successively engaging said segments that are connected together through said stator windings, said member also supporting a pair of slip rings insulated from each other, each slip ring being connected to at least one said brush; a slip-ring brush supported outside said pressure vessel in engagement with each said slip ring; an auxiliary motor outside said pressure vessel for rotating said rotatable member; and means outside said pressure vessel for connecting a power source of direct current to each said slip ring brush.

5. A direct current hermetic motor-pump, including in combination a pressure vessel; a wire-wound stator; a rotor; pump elements inside said pressure vessel driven by said rotor; a commutator ring supported by said stator outside said pressure vessel and having a plurality of segments each connected through said stator windings to another segment; a rotatable member outside said pressure vessel having brushes supported in contact with said commutator and during rotation successively engaging said segments that are connected together through said stator windings, said member also supporting a pair of slip rings insulated from each other and one connected to each brush; slip-ring brush means supported outside said pressure vessel in engagement with each said slip ring; and means wholly outside said pressure vessel for rotating said rotatable member.

6. A direct current motor-pump, including in combination a main motor having a wire-wound stator and end plates providing a pressure vessel, a rotor inside said stator and compressor pump elements inside said rotor and driven thereby; fluid inlet and outlet means through said pressure vessel; a commutator ring supported by said stator outside said pressure vessel and having a plurality of segments each connected electrically to said stator windings; a rotatable member outside said pressure vessel having a pair of brush means in contact with said commutator, so that during rotation a rotating field is set up in said stator windings, said member also supporting a pair of slip rings insulated from each other, one being connected to each said brush means; stationary slip-ring brush means in engagement with each said slip ring; an auxiliary motor mounted on one said end plate concentrically with said stator for rotating said rotatable member; and means for connecting a power source of direct current to said auxiliary motor and across said slip ring brush means.

7. A direct current motor-pump, including in combination a main motor having a wire-wound stator and end plates providing a pressure vessel, a squirrel-cage rotor inside said stator and compressor pump elements inside said rotor and driven thereby; fluid inlet and outlet means through said pressure vessel; a commutator ring supported by said stator outside said pressure vessel and having a plurality of segments each connected electrically to said stator windings; a rotatable member outside said pressure vessel having a pair of brush means supported in contact with said commutator, so that during rotation segments are energized through the rotary brushes to provide a rotating electric field within said stator stationary windings and to create a rotating magnetic circuit in the stator windings in synchronism with the mechanically driven brushes, said member also supporting a pair of slip rings insulated from each other, one being connected to each said brush means; stationary slip-ring brush means supported in engagement with each said slip ring for transferring current from said stationary slip-ring brush means to the rotating said brush means; an auxiliary motor mounted on one said end plate concentrically with said stator for rotating said rotatable member; and means for connecting a power source of direct current to said auxiliary motor and to said slip-ring brush means.

8. A direct current motor-pump or compressor, including in combination a main motor having a plastic impregnated and sealed, laminated, wire-wound stator, end plates closing the bore of said stator to provide therewith a pressure vessel, fluid inlet and outlet means through at least one said end plate; a rotor inside said stator, an outer pump element rigidly secured inside said rotor and rotatable thereby concentric to said stator bore, and an inner eccentrically located pump element driven by said outer element, a pair of end rings at each end of said stator having inner and outer peripheries coterminous with those of said stator, one said ring having an axially extending flange; a metal support ring supported partly by said flange; a stationary commutator ring supported by said support ring outside said pressure vessel and having a plurality of insulated segments; means connecting each segment through said stator windings to another segment; a rotatable member outside said pressure vessel having commutator brushes supported in contact with said commutator; a pair of slip rings supported by said rotatable member, insulated from each other and each connected to a said brush; stationary slip-ring brushes in engagement with each said slip-ring; an auxiliary motor supported by one said end plate concentric with said commutator; a direct driving connection between said motor and said rotatable member; a power source of direct current having conductors to said slip ring brushes; and wires including a variable resistance connecting said power source across said auxiliary motor.

9. A unified hermetic direct-current motor-compressor system including in combination a squirrel-cage drive motor rotor having pumping means inside; a drive motor stator having wire windings and walls; end members forming part of a pressure vessel enclosing said rotor and said pumping means, said stator having a segmented stationary commutator outside said pressure vessel supported by said stator and electrically connected to said stator windings; a rotatable brush holder member outside said pressure vessel having brushes in contact with said commutator and having slip rings electrically connected to said brushes; stationary brushes in contact with said slip rings; an auxiliary motor outside said pressure vessel for rotating said rotatable brush holder, thereby to establish a rotating magnetic field within the stationary stator windings, which in turn cause the squirrel-cage rotor to follow the rotating magnetic field in said stator windings; a rheostat outside said pressure vessel for manually adjusting the speed of said auxiliary motor; and means connecting each of the two motors to a source of direct current, the speed of the auxiliary motor being imposed on the drive motor by the rate of brush rotation.

10. A unified hermetic direct current motor-compressor system including in combination a wire-wound pressure-sealed drive motor stator having a bore closed at each end by stationary ported plates which allow fluid to enter and to leave; a motor rotor positioned to rotate inside said bore; a pair of pumping elements one inside the other and both inside said rotor; said drive motor stator being provided with an external stationary segmented commutator; external rotating brushes in contact with said commutator for conducting current thereto; external rotating slip rings electrically connected to said brushes; stationary brushes in contact with said rings for conducting current thereto; a brush-holder supporting said external rotating brushes and said slip rings; an auxiliary external motor for rotation of said brush holder with its motor brushes and slip rings; a D.-C. electrical circuit connected to said auxiliary motor; a rheostat interposed in the auxiliary motor circuit to control the speed of said auxiliary motor, said speed being mechanically imposed on the drive motor by the rate of brush rotation.

References Cited in the file of this patent

UNITED STATES PATENTS

| | | |
|---|---|---|
| 730,891 | Eickemeyer | June 16, 1903 |
| 1,526,613 | Stephenson | Feb. 17, 1925 |
| 2,669,667 | Haines | Feb. 16, 1954 |
| 2,697,192 | Wiley | Dec. 14, 1954 |
| 2,711,286 | McAdams | June 21, 1955 |

FOREIGN PATENTS

| | | |
|---|---|---|
| 498,968 | Belgium | Feb. 15, 1951 |
| 643,520 | Germany | Apr. 10, 1937 |